United States Patent
Yamaoka et al.

(10) Patent No.: US 10,193,996 B2
(45) Date of Patent: Jan. 29, 2019

(54) LOAD BALANCING METHOD, INFORMATION PROCESSING APPARATUS, AND STORAGE MEDIUM

(71) Applicant: FUJITSU LIMITED, Kawasaki-shi, Kanagawa (JP)

(72) Inventors: Hisatoshi Yamaoka, Kawasaki (JP); Takashi Imai, Atsugi (JP); Toru Kamiwada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 360 days.

(21) Appl. No.: 15/133,913

(22) Filed: Apr. 20, 2016

(65) Prior Publication Data
US 2016/0330124 A1 Nov. 10, 2016

(30) Foreign Application Priority Data
May 8, 2015 (JP) .................. 2015-095937

(51) Int. Cl.
G06F 15/16 (2006.01)
H04L 29/08 (2006.01)
H04L 12/26 (2006.01)

(52) U.S. Cl.
CPC .............. *H04L 67/32* (2013.01); *H04L 67/12* (2013.01); *H04L 43/08* (2013.01)

(58) Field of Classification Search
CPC ................................ H04L 67/12; H04L 67/32
See application file for complete search history.

(56) References Cited

U.S. PATENT DOCUMENTS

2006/0282498 A1* 12/2006 Muro .................. H04L 67/34
709/203
2013/0246427 A1* 9/2013 Murata ............. G06F 17/30598
707/737

FOREIGN PATENT DOCUMENTS

JP 9-231184 9/1997
JP 2006-344017 12/2006

* cited by examiner

*Primary Examiner* — Yves Dalencourt
(74) *Attorney, Agent, or Firm* — Fujitsu Patent Center

(57) ABSTRACT

A load balancing method executed by an information processing apparatus, the load balancing method includes identifying, in first determination processing for determining circumstances based on an event acquired by a sensor included in the information processing apparatus, a type of an event that another information processing apparatus coupled to the information processing apparatus is able to acquire by using a sensor included in the another information processing apparatus; determining whether a logic tree representing the first determination processing is able to change to another logic tree that includes a partial logic tree determined based on an event of the identified type and is equivalent in condition to the logic tree; and assigning second determination processing represented by the partial logic tree included in the another logic tree to the another information processing apparatus, when determining that the logic tree is able to change to the another logic tree.

9 Claims, 16 Drawing Sheets

| CONDITION ID | CONDITION INFORMATION |
|---|---|
| 001 | A·B+C |
| 002 | (A·B)·C+D+E |
| 003 | ((A·B)·C)(D+E) |

| CONDITION ID | APPLICATION NAME |
|---|---|
| 001 | APPLICATION 1 |
| 002 | APPLICATION 2 |
| 003 | APPLICATION 3 |

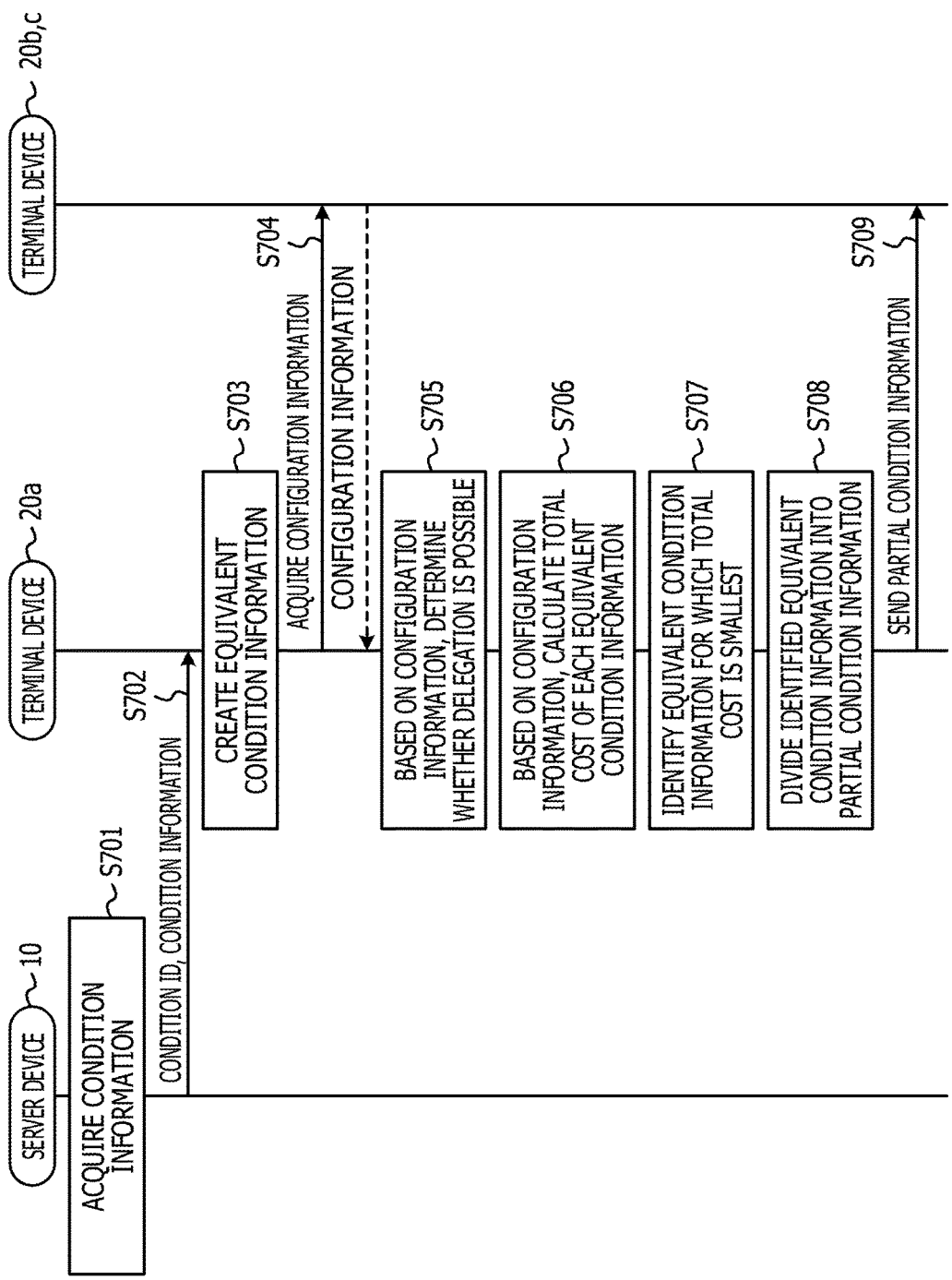

FIG. 8

BASIC EXPANSION $$A = A(B+\overline{B}) = A(C+\overline{C})$$
$$B = B(C+\overline{C}) = B(A+\overline{A})$$
$$C = C(B+\overline{B}) = C(A+\overline{A})$$

S11)

$A \cdot B + C$ $= A \cdot B(C+\overline{C}) + C \cdot (A+\overline{A})$ $= A \cdot B \cdot C + A \cdot B \cdot \overline{C} + A \cdot C + \overline{A} \cdot C$ $= A \cdot B \cdot C + A \cdot B \cdot \overline{C} + A \cdot C \cdot (B+\overline{B}) + \overline{A} \cdot C \cdot (B+\overline{B})$ $= A \cdot B \cdot C + A \cdot B \cdot \overline{C} + A \cdot B \cdot C + A \cdot \overline{B} \cdot C + \overline{A} \cdot B \cdot C + \overline{A} \cdot \overline{B} \cdot C$ $= A \cdot B \cdot C + \overline{A} \cdot B \cdot C + A \cdot \overline{B} \cdot C + A \cdot B \cdot \overline{C} + \overline{A} \cdot \overline{B} \cdot C$

USING BASIC EXPRESSION, EXPANDED INTO PRINCIPAL DISJUNCTION CANONICAL

S12)

$A \cdot B + C$ $= \boxed{A \cdot B} \cdot C + \boxed{\overline{A} \cdot B} \cdot C + \boxed{A \cdot \overline{B}} \cdot C + \boxed{A \cdot B} \cdot \overline{C} + \boxed{\overline{A} \cdot \overline{B}} \cdot C$

IDENTIFY PAIR OF VARIABLES FORMING SYMMETRIC EXPRESSION

S13)

$\underline{A \cdot B + C}$  =  $\underline{B \cdot A + C}$

ORIGINAL CONDITION EXPRESSION

EQUIVALENT CONDITION EXPRESSION

REPLACE IDENTIFIED PAIR OF VARIABLES WITH EACH OTHER TO CREATE EQUIVALENT CONDITION EXPRESSION

| SENSOR TYPE | COST (POWER CONSUMPTION (W)) |
|---|---|
| TEMPERATURE SENSOR | 0.9 |
| HUMIDITY SENSOR | 0.8 |
| VIBRATION SENSOR | 1.2 |
| ILLUMINATION SENSOR | 0.7 |
| ULTRAVIOLET RADIATION SENSOR | 0.7 |
| $CO_2$ SENSOR | 1.0 |

231b

| SENSOR TYPE | COST (POWER CONSUMPTION (W)) |
|---|---|
| ILLUMINATION SENSOR | 0.3 |
| ULTRAVIOLET RADIATION SENSOR | 0.3 |

231c

| SENSOR TYPE | COST (POWER CONSUMPTION (W)) |
|---|---|
| TEMPERATURE SENSOR | 0.9 |
| VIBRATION SENSOR | 1.0 |

FIG. 10

| CONDITION EXPRESSION | TOTAL COST |
|---|---|
| $(A \cdot B) \cdot C \cdot (D + (E + F))$ | 5.3 |
| $(A \cdot B) \cdot C \cdot (F + \boxed{(D + E)})$ | 4.5 |
| $(A \cdot B) \cdot C \cdot (E + (D + F))$ | 5.3 |
| $\vdots$ | $\vdots$ |
| $\boxed{(B \cdot C)} \cdot A \cdot (F + \boxed{(D + E)})$ | <u>4.4</u> ← TOTAL COST IS SMALLEST |
| $\boxed{(B \cdot C)} \cdot A \cdot (E + (D + F))$ | 5.2 |

| OPERATION TYPE | COST (PROCESSING TIME (ms)) |
|---|---|
| AND | 0.3 |
| OR | 0.4 |

242b

| SENSOR TYPE | COST (PROCESSING TIME (ms)) |
|---|---|
| AND | 0.1 |
| OR | 0.2 |

242c

| SENSOR TYPE | COST (PROCESSING TIME (ms)) |
|---|---|
| AND | 0.3 |
| OR | 0.3 |

FIG. 15

| CONDITION EXPRESSION | TOTAL COST |
|---|---|
| $(A \cdot B) \cdot C \cdot (D+(E+F))$ | 7.1 |
| $(A \cdot B) \cdot C \cdot (F+(D+E))$ | 6.9 |
| $(A \cdot B) \cdot C \cdot (E+(D+F))$ | 7.1 |
| ⋮ | ⋮ |
| $(B \cdot C) \cdot A \cdot (F+(D+E))$ | 6.8 ← TOTAL COST IS SMALLEST |
| $(B \cdot C) \cdot A \cdot (E+(D+F))$ | 7.0 |

LOAD BALANCING METHOD, INFORMATION PROCESSING APPARATUS, AND STORAGE MEDIUM

CROSS-REFERENCE TO RELATED APPLICATION

This application is based upon and claims the benefit of priority of the prior Japanese Patent Application No. 2015-095937, filed on May 8, 2015, the entire contents of which are incorporated herein by reference.

FIELD

The embodiments discussed herein are related to a load balancing method, an information processing apparatus, and a storage medium.

BACKGROUND

A technique in which an event sensed by a plurality of sensors mounted in a terminal, such as a smart phone or a tablet, is evaluated based on a rule described by a logic tree of a combination of OR operation and AND operation, and the circumstances in which the terminal is used is known.

The circumstances in which the terminal is used is also referred to as context. A service is proposed in which a server delivers an application in accordance with a context determined by a terminal to the terminal, and the terminal uses the delivered application on the spot. As related art, for example, Japanese Laid-open Patent Publication No. 2006-344017, Japanese Laid-open Patent Publication No. 9-231184, and so on are disclosed.

Dividing a logic tree given to a terminal into partial logic trees and causing another terminal to evaluate a rule described by the partial logic trees makes it possible for a terminal to distribute the load of processing used in determining the context.

However, there are some cases where a rule described by divided partial logic trees is not able to be evaluated by another terminal. For example, when a terminal does not have information on the type of a sensor mounted in another terminal, a terminal is sometimes not able to divide partial logic trees that may be evaluated by using an event sensed in the other terminal. It is desirable that the load of processing for determining context is distributed and thus the load of determination processing in an information processing apparatus is able to be reduced.

SUMMARY

According to an aspect of the invention, a load balancing method executed by an information processing apparatus, the load balancing method includes identifying, in first determination processing for determining circumstances based on an event acquired by a sensor included in the information processing apparatus, a type of an event that another information processing apparatus coupled to the information processing apparatus is able to acquire by using a sensor included in the another information processing apparatus; determining whether a logic tree representing the first determination processing is able to change to another logic tree that includes a partial logic tree determined based on an event of the identified type and is equivalent in condition to the logic tree; and assigning second determination processing represented by the partial logic tree included in the another logic tree to the another information processing apparatus, when determining that the logic tree is able to change to the another logic tree.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram depicting an example of a configuration of a condition information table according to the first embodiment;

FIG. 6 is a diagram depicting an example of a configuration of an application information table according to the first embodiment;

FIG. 7 is a diagram for explaining an example of a flow of a series of processing from acquisition of condition information to transmission of partial condition information in an application delivery process according to the first embodiment;

FIG. 8 is a diagram serving to illustrate a specific example of creation of equivalent condition information according to the first embodiment;

FIG. 9 includes diagrams depicting an example of a configuration of configuration information according to the first embodiment;

FIG. 10 is a diagram for explaining a specific example of calculation of a total cost according to the first embodiment;

FIG. 13 includes diagrams illustrating an example of a configuration of performance information according to the second embodiment;

FIG. 15 is a diagram serving to illustrate a specific example of calculation of a total cost according to the second embodiment.

DESCRIPTION OF EMBODIMENTS

Hereinafter, embodiments of the present disclosure will be described with reference to the accompanying drawings.

First Embodiment

Figure 1:
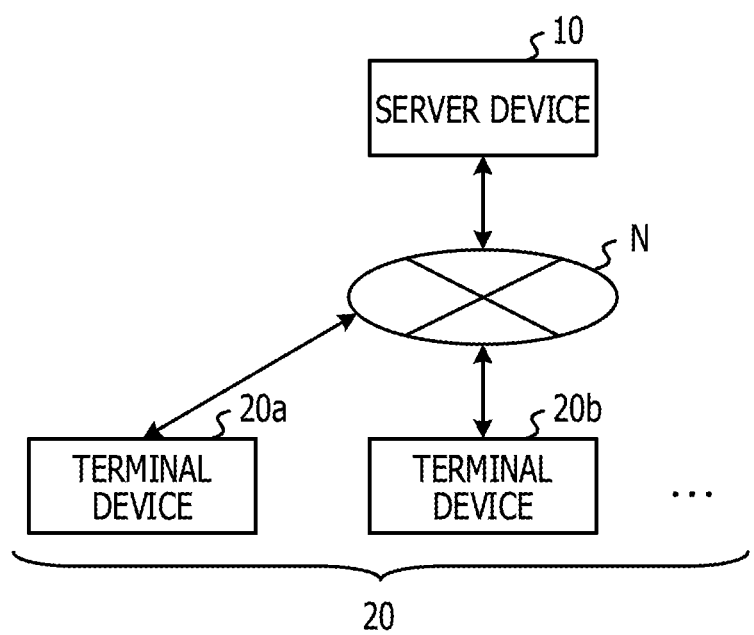
FIG. 1 is a diagram illustrating an example of an overall configuration of an application distribution system according to a first embodiment.

The overall configuration of an application delivery system according to a first embodiment will be described with reference to FIG. 1. FIG. 1 is a diagram illustrating an example of an overall configuration of an application delivery system according to the first embodiment. An application delivery system 1 according to the present embodiment includes a server device 10 and a plurality of terminal devices 20. The server device 10 and the terminal devices 20 are coupled over a network N such as the Internet.

The server device 10 sends condition information for the terminal device 20 to determine a context. The server device 10 delivers an application in accordance with a determination result notified by the terminal device 20.

Here, the condition information is information for the terminal device 20 to determine a context. The condition information is represented by, for example, a logic tree in which conditions such as temperature, humidity, illumination, and the amount of ultraviolet radiation are combined by AND or OR. The context is circumstances in which the terminal device 20 is used. The context is represented by, for example, temperature, humidity, illumination, the amount of ultraviolet radiation, or the like.

The terminal device 20 is an information processing apparatus in which various types of sensors, such as a temperature sensor and a humidity sensor, are mounted. The terminal device 20 is, for example, a smart phone, a tablet terminal, a notebook PC, a desktop PC, a game machine, a personal digital assistant (PDA), or the like. The terminal device 20 determines the context of the terminal device 20 based on event information acquired by sensing of various types of sensors and condition information received from the server device 10, and notifies the server device 10 of a determination result. Thus, the terminal device 20 acquires an application in accordance with the context from the server device 10.

Here, the event information is information acquired by sensing of various types of sensors. The event information is a measurement value "28° C." or the like measured by, for example, a temperature sensor. However, the event information is not limited to measurement values measured by various types of sensors. For example, the event information may be information representing concepts such as "hot" and "cold" obtained based on measurement values measured by sensors.

The terminal device 20 according to the present embodiment may distribute and reduce the processing load in the terminal device 20 by assigning part of the processing for determining context to other terminal devices 20.

Hereinafter, each of a plurality of terminal devices 20 is referred to as a terminal device 20a, a terminal device 20b, or the like when the terminal devices 20 are referred to differently from one another.

Figure 2:
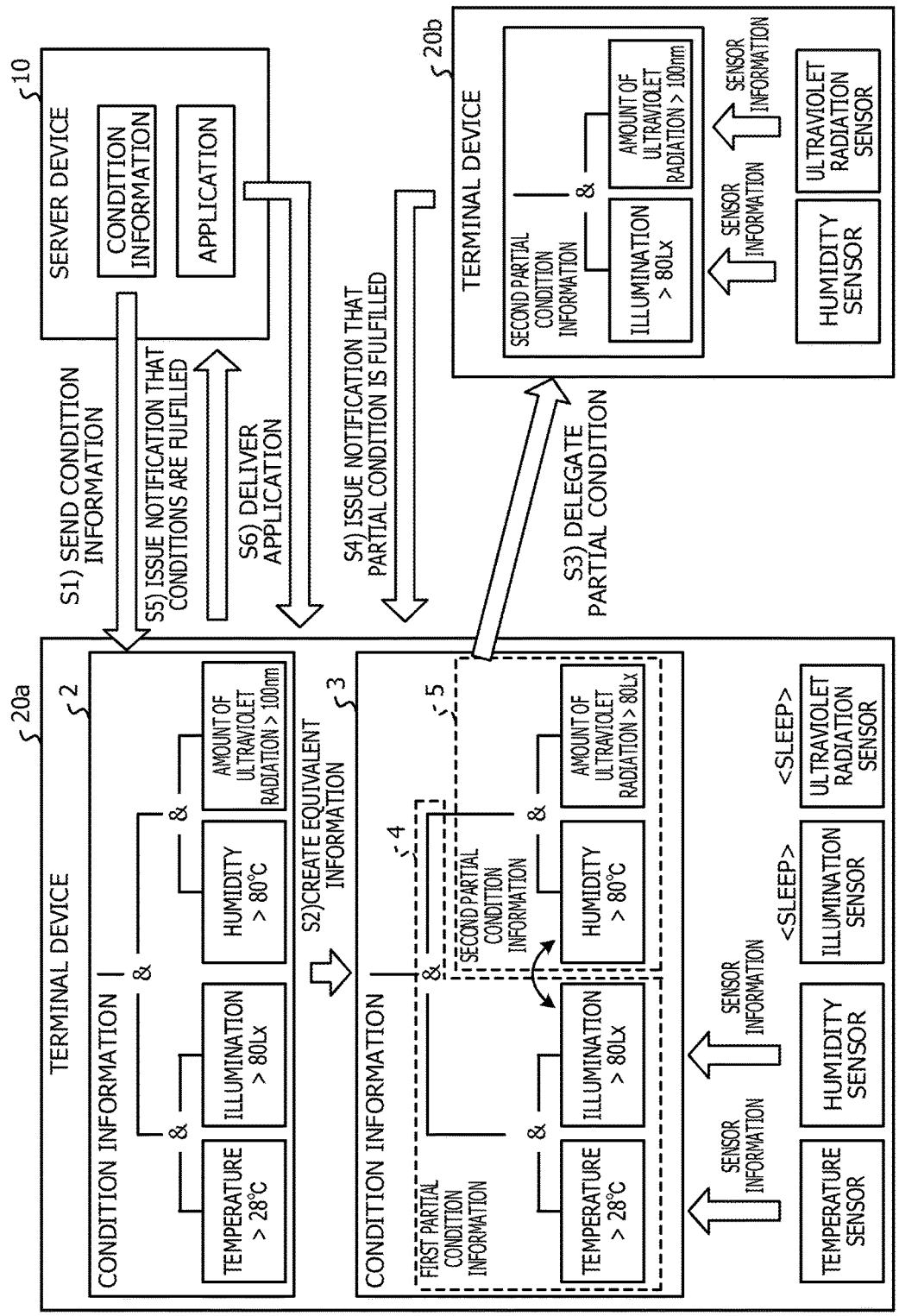
FIG. 2 is a diagram serving to illustrate application distribution.

Here, the case where, in the application delivery system 1 according to the present embodiment, an application in accordance with context is delivered from the server device 10 to the terminal devices 20 will be described with reference to FIG. 2. FIG. 2 is a diagram serving to illustrate application delivery. Hereinafter, the terminal device 20 that assigns part of the processing for determining context (a terminal device 20 serving as the delegation source) is denoted as a terminal device 20a. A terminal device 20 to which the part of the processing is assigned (a terminal device 20 serving as the delegation target) is denoted as a terminal device 20b. In the terminal device 20a, a temperature sensor, a humidity sensor, an illumination sensor, and an ultraviolet radiation sensor are assumed to be mounted. In the terminal device 20b, an illumination sensor and an ultraviolet radiation sensor are assumed to be mounted.

In S1, the server device 10 sends condition information to the terminal device 20a. The condition information is information for the terminal device 20a to determine context and is represented by a logic tree. Here, it is assumed that the server device 10 has sent, to the terminal device 20a, condition information 2 represented by a logic tree as illustrated in FIG. 2. The condition information 2 is condition information for which the conditions are determined to be fulfilled when "temperature>28° C." and "illumination>80 Lx" as well as "humidity>80%" and "the amount of ultraviolet radiation>100 nm".

The condition information 2 does not include a partial condition determinable based on sensing of sensors mounted in the terminal device 20b. Accordingly, with the condition information 2, it is not possible to assign some of the conditions to the terminal device 20b.

In S2, the terminal device 20a creates condition information 3 that is equivalent in conditions to the condition information 2. That is, the terminal device 20a replaces "illumination>80 Lx" and "humidity>80%" with each other in the condition information 2 to create condition information 3, which is equivalent in conditions to the condition information 2. Here, the condition information 3 includes a partial condition determinable based on sensing of sensors mounted in the terminal device 20b.

In such a way, the terminal device 20a of the present embodiment creates the condition information 3, which is equivalent in conditions to the condition information 2 acquired from the server device 10. This enables the terminal device 20a of the present embodiment to create condition information that is condition information equivalent in conditions to the condition information 2 acquired from the server device 10 and which allows some of the conditions to be determined in the terminal device 20b.

In S3, the terminal device 20a sends, out of the condition information 3, the second partial condition information 5, which is a condition determinable based on sensing of sensors mounted in the terminal device 20a, to the terminal device 20b. That is, the terminal device 20a assigns conditions based on the second partial condition information 5 out of the condition information 3 to the terminal device 20b.

Further, the terminal device 20b makes a determination for the second partial condition information 5 sent from the terminal device 20a, based on event information acquired by sensing of sensors mounted in the terminal device 20b. The terminal device 20a makes a determination for the first partial condition information 4 that has not been sent to the terminal device 20b, out of the condition information 3, based on event information acquired by sensing of sensors mounted in the terminal device 20a.

In such a way, the terminal device 20a of the present embodiment may reduce the load of processing for determining conditions in the terminal device 20a by assigning some of the conditions out of the condition information 3 to the terminal device 20b.

In S4, if it is determined based on the event information that the conditions for the second partial condition information 5 are fulfilled, the terminal device 20b notifies the terminal device 20a that the partial condition is fulfilled.

In S5, if the terminal device 20a is notified by the terminal device 20b that the partial condition is fulfilled, the terminal device 20a determines based on event information whether or not the conditions of the first partial condition information 4 are fulfilled. Further, if it is determined that the conditions of the first partial condition information 4 are fulfilled (that is, if it is determined that the conditions of the condition information 3 are fulfilled), the terminal device 20a notifies the server device 10 that the conditions are fulfilled.

In S6, when notified by the terminal device 20a that the conditions are fulfilled, the server device 10 sends an application corresponding to the condition information 2 to the terminal device 20a. Thus, an application in accordance with context is delivered to the terminal device 20a.

As described above, in the application delivery system 1 according to the present embodiment, the server device 10 sends condition information for determining context to the terminal device 20. Further, if the conditions based on condition information are fulfilled in the terminal device 20, the server device 10 sends an application in accordance with the condition information for which the conditions are fulfilled. Thus, an application in accordance with context is delivered to the terminal device 20.

In the terminal device 20 of the present embodiment, the processing for determining some of the conditions in the condition information received from the server device 10 is assigned to another terminal device 20. In such a way, distributing the processing for determining condition information over a plurality of terminal devices 20 may reduce the load of the processing for determining condition information in the terminal device 20.

In the example of FIG. 2, the case where the terminal device 20a assigns part of the determination processing to the terminal device 20b has been described. However, the assignment is not limited to this and the terminal device 20a may assign part of the determination processing to a plurality of other terminal devices 20. For example, the terminal device 20a may assign part of the determination processing to the terminal device 20b and assign another part of the determination processing to a terminal device 20c.

The terminal device 20 serving as the delegation target, to which part of the determination processing has been assigned from the terminal device 20 serving as the delegation source, may further assign part of the assigned part of the determination processing to another terminal device 20.

Further, the terminal device serving as the delegation target, or the like, does not have to be coupled to the network N and may be coupled to the terminal device 20 serving as the delegation source by wireless communication, such as Bluetooth (registered trademark) or radio frequency identifier (RFID), to the terminal device 20 serving as the delegation source. The terminal device 20 serving as the delegation source and the terminal device 20 serving as the delegation target may be coupled in a wired manner through, for example, a Universal Serial Bus (USB) cable.

Figure 3:
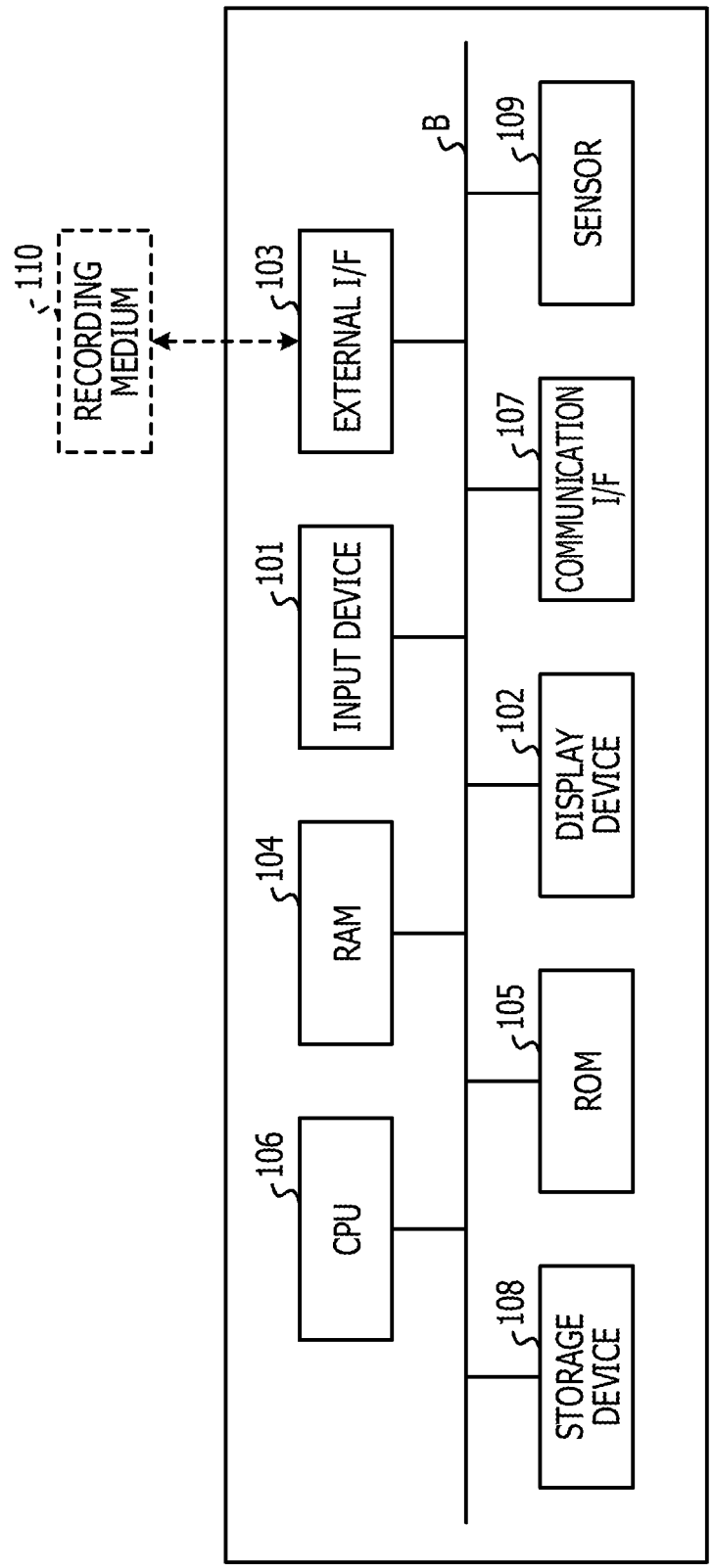
FIG. 3 is a diagram illustrating an example of a hardware configuration of a terminal device according to the first embodiment.

Next, the hardware configuration of the application delivery system 1 according to the present embodiment will be described. The server device 10 has a hardware configuration similar to that of the terminal device 20. For this reason, hereinafter, the hardware configuration of the terminal device 20 will be mainly described with reference to FIG. 3. FIG. 3 is a diagram illustrating an example of a hardware configuration of a terminal device according to the first embodiment.

The terminal device 20 includes an input device 101, a display device 102, an external interface (I/F) 103, a random access memory (RAM) 104, a read only memory (ROM) 105, a central processing unit (CPU) 106, a communication I/F 107, a storage device 108, and a sensor 109. These components of the hardware configuration are coupled to one another via a bus B.

The input device 101 includes a keyboard, a mouse, a touch panel, or the like and is used for inputting each operational signal to the terminal device 20. The display device 102 includes a display or the like and displays various kinds of processing results. In the server device 10, the input device 101 and/or the display device 102 may be in such a manner that, when they are desired, they are coupled for use.

The external I/F 103 is an interface with external devices. The external devices include a recording medium 110 or the like. Thus, the terminal device 20 may perform reading from and/or writing to the recording medium 110 via the external I/F 103. Examples of the recording medium 110 include a compact disk (CD), a digital versatile disk (DVD), a secure digital (SD) memory card, and a USB memory.

The RAM 104 is a volatile semiconductor memory that temporarily stores programs and data. The ROM 105 is a nonvolatile semiconductor memory that holds data even when the power supply is turned off. The CPU 106 is an arithmetic device that reads programs and data from, for example, the storage device 108, the ROM 105, or the like onto the RAM 104 and executes various kinds of processing.

The communication I/F 107 is an interface for coupling the terminal device 20 to the network N. This allows the terminal device 20 to perform data communication with the server device 10.

The storage device 108 is a nonvolatile memory in which programs and data are stored. The storage device 108 is, for example, a hard disk drive (HDD), a solid state drive (SSD), or the like. The programs or data stored therein include an operating system (OS), which is basic software that controls the entirety of the terminal devices 20, or various types of programs running on the OS (for example, programs that implement the present embodiment).

As the sensor 109, for example, sensors of various types, such as a temperature sensor, a humidity sensor, an illumination sensor, a vibration sensor, and an ultraviolet radiation sensor are provided. The terminal device 20 determines context based on event information acquired by sensing of the sensor 109. The server device 10 does not have to include the sensor 109.

In the terminal device 20 according to the present embodiment, various kinds of processing described below are implemented by the hardware configuration illustrated in FIG. 3.

Figure 4:
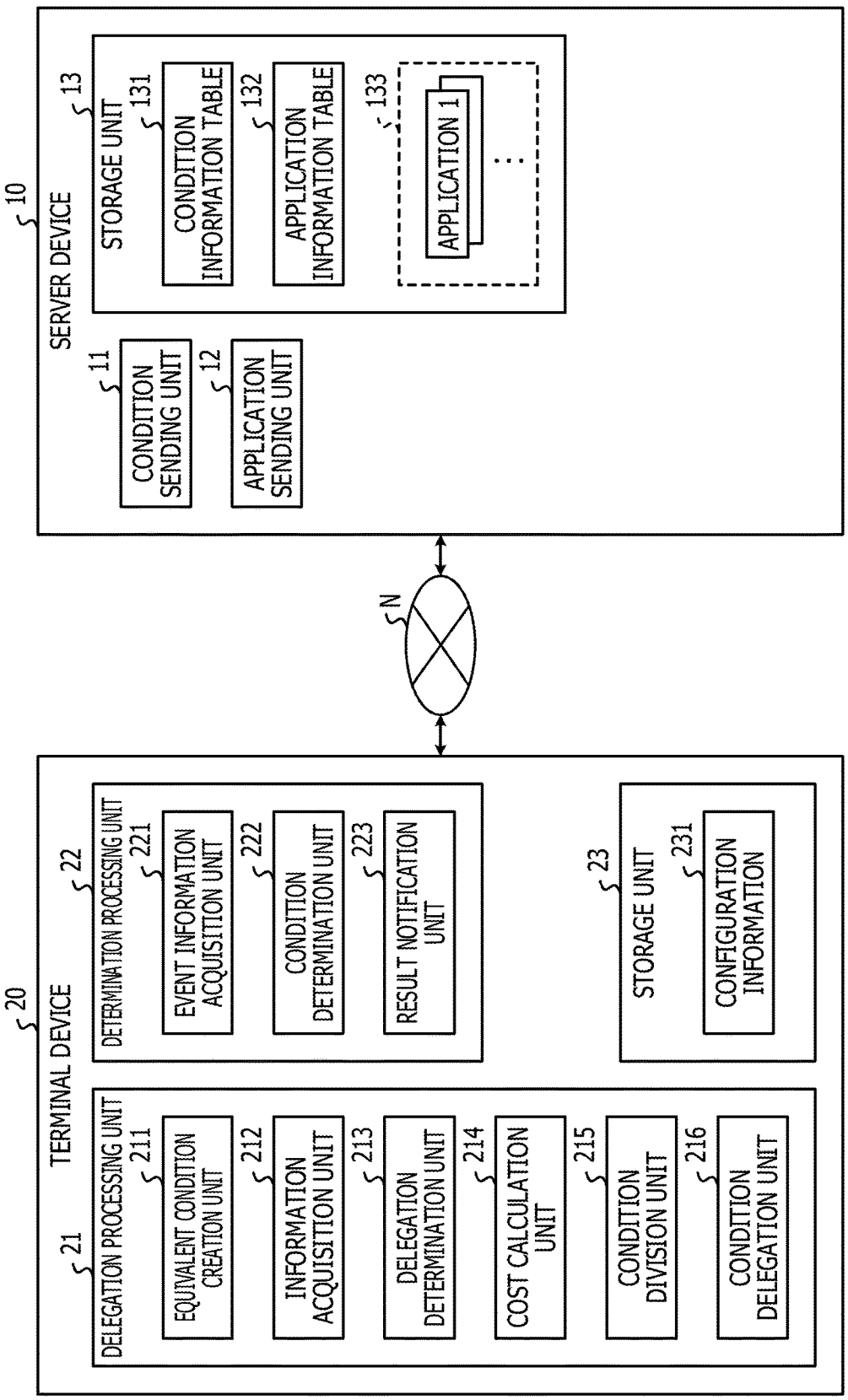
FIG. 4 is a diagram illustrating an example of a functional configuration of an application distribution system according to the first embodiment.

Next, the functional configuration of the application delivery system 1 according to the present embodiment will be described with reference to FIG. 4. FIG. 4 is a diagram illustrating an example of a functional configuration of an application delivery system according to the first embodiment.

The server device 10 includes a condition sending unit 11 and an application sending unit 12. Each of these units is implemented by a process when a program installed in the server device 10 causes the CPU to execute the process. The server device 10 includes a storage unit 13. The storage unit 13 is implementable by using a storage device included in the server device 10, a storage device coupled via the network N to the server device 10, or the like.

The condition sending unit 11 acquires condition information from the condition information table 131 described below and sends it to the terminal device 20.

The application sending unit 12 sends, to the terminal device 20, an application in accordance with the context of the terminal device 20, based on an application information table 132 described below. That is, having received a notification of fulfilment of conditions based on condition information from the terminal device 20, the application sending unit 12 sends an application corresponding to this condition information to the terminal device 20.

In the storage unit 13, the condition information table 131, the application information table 132, and applications 133 are stored. The application 133 is a program that is sent to the terminal device 20 in accordance with fulfillment of the conditions based on the condition information and is executed on the terminal device 20. The condition information table 131 and the application information table 132 will be described in detail below.

The terminal device 20 includes a delegation processing unit 21 and a determination processing unit 22. Each of these units is implemented by a process when a program installed in the terminal device 20 causes the CPU 106 to execute the process. The terminal device 20 includes a storage unit 23. The storage unit 23 is implementable by using the storage device 108.

The delegation processing unit 21 performs processing for assigning, to another terminal device, processing for determining some of the conditions included in the condition information received from the server device 10. A determination processing unit 22 performs processing for determining conditions based on condition information or the like. The storage unit 23 stores configuration information 231. The configuration information 231 will be described in detail below.

The delegation processing unit 21 includes an equivalent condition creation unit 211, an information acquisition unit 212, a delegation determination unit 213, a cost calculation unit 214, a condition division unit 215, and a condition delegation unit 216.

Based on the condition information received from the server device 10, the equivalent condition creation unit 211 creates equivalent condition information, which is equivalent in conditions to this condition information.

The information acquisition unit 212 acquires the configuration information 231 of another terminal device 20. Here, the configuration information 231 is information related to the type of the sensor 109 included in the terminal device 20 and the cost taken when sensing is performed by the sensor 109. The cost is, for example, power consumption per unit time when sensing is performed by the sensor 109.

The delegation determination unit 213 determines whether or not, based on the configuration information 231 acquired by the information acquisition unit 212, processing for determining some of the conditions included in equivalent condition information is able to be assigned to another terminal device 20.

Based on the configuration information 231 acquired by the information acquisition unit 212, the cost calculation unit 214 calculates a total cost of equivalent condition information. Here, when the cost is power consumption per unit time, the total cost is the sum of power consumed per unit time by each terminal device 20 in the determination processing based on equivalent condition information.

The condition division unit 215 divides the equivalent condition information into partial condition information based on the total cost calculated by the cost calculation unit 214.

The condition delegation unit 216 sends partial condition information obtained by the division performed by the condition division unit 215 to another terminal device 20. Thus, the terminal device 20 is able to assign, to another terminal device 20, part of the processing for determining conditions based on condition information received from the server device 10.

The determination processing unit 22 includes an event information acquisition unit 221, a condition determination unit 222, and a result notification unit 223.

The event information acquisition unit 221 acquires event information from the sensor 109. The event information acquisition unit 221 may acquire, as event information, information based on measurement values measured in the sensor 109. For example, the event information acquisition unit 221 may acquire information "hot" based on a measurement value "28° C." measured by using a temperature sensor.

The condition determination unit 222 makes a determination of conditions based on partial condition information, based on event information acquired by the event information acquisition unit 221.

If, in the terminal device 20 serving as the delegation source, it is determined by the condition determination unit 222 that conditions based on partial condition information are fulfilled, the result notification unit 223 sends the result to the server device 10. If, in the terminal device 20 serving as the delegation target, it is determined by the condition determination unit 222 that conditions based on partial condition information are fulfilled, the result notification unit 223 sends the determination result to the terminal device 20 serving as the delegation source.

Here, the condition information table 131 will be described in detail with reference to FIG. 5. FIG. 5 is a diagram depicting an example of a configuration of a condition information table according to the first embodiment.

In the condition information table 131 illustrated in FIG. 5, condition information for the terminal device 20 to determine context is stored in association with condition IDs that uniquely identify the condition information. Here, condition information is represented by a logic tree in which AND operation and OR operation are combined. Therefore, for example, "temperature>28° C." is represented as a symbol "A", "humidity>80%" as a symbol "B", "vibration>50 dB" as a symbol "C", and the like and thus the logic tree may be represented as a logical expression.

For example, as illustrated in FIG. 5, a logic tree expressing ("temperature>28° C." and "humidity>80%") or "vibration>50 dB" may be expressed as "A·B+C" assuming that OR operation is "·" and AND operation is "+". Accordingly, hereinafter, the logical expression expressed in this manner is regarded as the same as the logic tree, and description will be given assuming that condition information is expressed in the logical expression.

Next, the application information table 132 will be described in detail with reference to FIG. 6. FIG. 6 is a diagram depicting an example of a configuration of an application information table according to the first embodiment.

In the application information table 132 depicted in FIG. 6, application names included in the applications 133 are stored in association with the condition IDs. Thereby, having received a notification of fulfillment of conditions based on condition information from the terminal device 20, the server device 10 may deliver, to the terminal device 20, the application 133 corresponding to the condition ID of this condition information.

Next, an application delivery process of the application delivery system 1 according to the first embodiment will be described. First, in the application delivery process, processing during which the terminal device 20 acquires condition information from the server device 10 and eventually part of the processing for determining conditions based on the condition information is assigned to another terminal device 20 will be described with reference to FIG. 7. FIG. 7 is a diagram serving to illustrate an example of the flow of a series of processing from acquisition of condition information to sending of partial condition information in the application delivery system according to the first embodiment. Hereinafter, description will be given assuming that the terminal device 20 serving as the delegation source is "the terminal device 20a" and the terminal devices 20 serving as delegation destinations are "the terminal device 20b" and "the terminal device 20c".

First, the server device 10 acquires a condition ID and condition information from the condition information table 131 in the storage unit 13 by using the condition sending unit 11 (S701) and sends them to the terminal device 20a (S702).

For example, based on position information, a user ID, and the like acquired from the terminal device 20a, the server device 10 acquires a condition ID and condition information from the condition information table 131 and sends them to the terminal device 20a. The server device 10, for example, sends all the condition IDs and condition information stored in the condition information table 131 to the terminal device 20a.

Next, the terminal device 20a creates equivalent condition information based on the received condition information, by using the equivalent condition creation unit 211 (S703). The equivalent condition information refers to a logical expression in which the condition information and the conditions are equivalent. The equivalent condition creation unit 211 may create equivalent condition information, for example, by expanding a logical expression represented by the condition information into a principal disjunctive canonical form. However, the way to create equivalent condition information is not limited to this. The equivalent condition creation unit 211 may create equivalent condition information, for example, using a Karnaugh map.

Here, a specific example of generating equivalent condition information through expansion into a principal disjunctive canonical form will be described with reference to FIG. 8. FIG. 8 is a diagram serving to illustrate a specific example of generation of equivalent condition information according to the first embodiment.

S11) First, it is assumed that the terminal device 20a receives condition information "A·B+C" from the server device 10. At this point, the equivalent condition creation unit 211 uses a basic expansion to expand the condition information "A·B+C" into a principal disjunction canonical form as illustrated in FIG. 8.

S12) Next, the equivalent condition creation unit 211 identifies a pair of variables in a symmetric expression from the condition information "A·B+C" expanded into a principal disjunction canonical. In FIG. 8, variables A and B represented by shading form a symmetric expression. In this way, a pair of variables forming a symmetric expression in a logical expression expanded into a principal disjunctive canonical does not change in terms of conditions even if variables are replaced with each other in the original logical expression.

S13) The equivalent condition creation unit 211 replaces the variables of the identified pair of variables with each other to create equivalent condition information. In conjunction with FIG. 8, by replacing variables A and B with each other, the equivalent condition information "B·A+C" of the condition information "A·B+C" is created. In the example of FIG. 8, one pair of variables form a symmetric expression in S12. However, in the case where there are a plurality of pairs of variables, each pair forming a symmetric expression, a plurality of pieces of equivalent condition information are created for one condition information. Hereinafter, the condition information represented by the original symmetric expression and the equivalent condition information created by the equivalent condition creation unit 211 are not distinguished from each other and are also referred to as equivalent condition information.

Turning now to FIG. 7, description will be given. The terminal device 20a acquires the configuration information 231 from the terminal device 20b and the terminal device 20c by using the information acquisition unit 212 (S704). Hereinafter, the configuration information 231 of the terminal device 20a is referred to as configuration information 231a, the configuration information 231 of the terminal device 20b as configuration information 231b, and the configuration information 231 of the terminal device 20c as configuration information 231c, so that they are distinguished from one another. Accordingly, the information acquisition unit 212 acquires the configuration information 231b and the configuration information 231c from the terminal device 20b and the terminal device 20c, respectively.

Here, the configuration information 231a stored in the storage unit 23 of the terminal device 20a and the configuration information 231b and the configuration information 231c acquired in S704 will be described with reference to FIG. 9. FIG. 9 includes diagrams depicting a configuration example of configuration information according to the first embodiment.

In the configuration information 231a to 231c depicted in FIG. 9, sensor types of sensors mounted in the terminal device 20 are stored in association with costs each representing power consumption per unit time.

That is, in the configuration information 231a, the sensor type of each of sensors mounted in the terminal device 20a and the cost of the sensor are associated with each other. Similarly, in the configuration information 231b and the configuration information 231c, the sensor types of sensors mounted in the terminal device 20b and the terminal device 20c and the costs of the sensors are associated with each other, respectively.

The terminal device 20a acquires the configuration information 231b and 231c as depicted in FIG. 9 from the terminal devices 20b and 20c and thus is able to acquire event information related to event types sensible in the terminal devices 20b and 20c and the costs caused by sensing.

Here, in the example of FIG. 9, power consumption per unit time is used as a cost. However, the cost is not limited to this. As the cost, for example, information on the accuracy of the sensor 109 may be used. In this case, it is sufficient that the cost of the sensor 109 with high accuracy is set to be high and the cost of the sensor 109 with low accuracy is set to be low.

In FIG. 7, the terminal device 20a acquires the configuration information 231b and 231c from the terminal devices 20b and 20c, respectively. However, the configuration information 231b and the configuration information 231c are not limited to this and may be stored in advance in the storage unit 23 of the terminal device 20a. The terminal device 20a may acquire the configuration information 231b and 231c from the server device 10.

Turning now to FIG. 7, description will be given. The terminal device 20a determines, by using the delegation determination unit 213, based on the configuration information 231b and 231c whether or not it is possible to assign part of the processing for determining conditions based on equivalent condition information to the terminal device 20b and the terminal device 20c (S705).

Specifically, the delegation determination unit 213 determines based on the sensor types of the configuration information 231b and 231c whether or not it is possible to assign part of the processing for determining conditions based on the equivalent condition information to the terminal devices 20b and 20c.

For example, according to the configuration information 231b, an illumination sensor and an ultraviolet radiation sensor are mounted in the terminal device 20b. Accordingly, when "D+E" or "D·E" is included in the equivalent condition information, the delegation determination unit 213 determines that it is possible to assign part of the processing for determining conditions based on the equivalent condition information to the terminal device 20b. A symbol "D" represents, for example, "illumination>80 Lx" and a symbol "E" represents, for example, "the amount of ultraviolet radiation>100 nm".

Similarly, according to the configuration information 231c, a humidity sensor and a vibration sensor are mounted in the terminal device 20c. Accordingly, when "B+C" or "B·C" is included in the equivalent condition information, the delegation determination unit 213 determines that it is possible to assign part of the processing for determining conditions based on the equivalent condition information to the terminal device 20c. The symbol "B" and the symbol "C" represent, for example, "humidity>80%" and "vibration>50 dB", respectively, as discussed above.

In S705, if, by the delegation determination unit 213, it is determined that it is not possible to assign part of the processing for determining conditions to any of the terminal devices 20b and 20c, the process is terminated. In this case, the terminal device 20a does not delegate the process for determining conditions based on condition information to the terminal devices 20a and 20b.

On the other hand, in S705, if, by the delegation determination unit 213, it is determined that it is possible to assign part of the processing for determining conditions to either one of the terminal devices 20b and 20c, the terminal device 20 executes the process in S706 to S709. Hereinafter, description will be given assuming that, in S705, by the delegation determination unit 213, it is determined that it is possible to assign part of the processing for determining conditions to both of the terminal devices 20b and 20c.

The terminal device 20a calculates the total cost of equivalent condition information by using the cost calculation unit 214 based on the configuration information 231a to 231c (S706).

Here, a specific example of calculating the total cost of equivalent condition information will be described with reference to FIG. 10. FIG. 10 is a diagram serving to illustrate a specific example of calculation of the total cost according to the first embodiment.

In the example of FIG. 10, it is assumed that the equivalent condition information is "(A·B)·C·(D+(E+F))", "(A·B)·C·(F+(D+E))", "(A·B)·C·(E+(D+F))", . . . , "(B·C)·A·(F+(D+E))", "(B·C)·A·(E+(D+F))". The cost calculation unit 214 calculates the total cost for these pieces of equivalent condition information based on the configuration information 231a to 231c.

For the equivalent condition information "(A·B)·C·(D+(E+F))", it is not possible to assign part of the processing for determining conditions to the terminal devices 20b and 20c.

Accordingly, the cost calculation unit 214 calculates the total cost based on the cost of the configuration information 231a. That is, the cost calculation unit 214 adds the cost for each sensor type with which event information corresponding to "A", "B", "C", "D", "E", and "F" in the terminal device 20a is acquired. Thus, the cost calculation unit 214 calculates the total cost of 0.9+0.8+1.2+0.7+0.7+1.0=5.3.

For the equivalent condition information "(A·B)·C·(F+(D+E))", it is possible to assign the processing for determining conditions of "(D+E)" shaded in FIG. 10 to the terminal device 20b. Accordingly, the cost calculation unit 214 calculates the total cost based on the cost of the configuration information 231a and the cost of the configuration information 231b. That is, the cost calculation unit 214 adds the cost for each sensor type with which event information corresponding to "A", "B", "C", and "F" is acquired in the terminal device 20a and the cost for each sensor type with which event information corresponding to "D" and "E" is acquired in the terminal device 20b. Thus, the cost calculation unit 214 calculates the total cost of 0.9+0.8+1.2+0.3+0.3+1.0=4.5.

Similarly, for the equivalent condition information "(B·C)·A·(F+(D+E))", it is possible to assign the processing for determining conditions of "(B·C)" shaded in FIG. 10 to the terminal device 20c, and to assign the processing for determining conditions of "(D+E)" to the terminal device 20b. Accordingly, the cost calculation unit 214 calculates the total cost of 4.4 based on the cost of the configuration information 231a to the cost of the configuration information 231c. For other equivalent condition information, the total cost is calculated similarly.

In the example of FIG. 10, the cost calculation unit 214 calculate the total cost of each equivalent condition information; however, the calculation is not limited to this. The cost calculation unit 214 may calculate, for example, the total cost of equivalent condition information determined, by the delegation determination unit 213 in S705, as being able to be assigned to other terminal device 20.

Turning now to FIG. 7, description will be given. By using the condition division unit 215, the terminal device 20a identifies equivalent condition information for which the total cost is smallest (S707). For example, in the example of FIG. 10, the condition division unit 215 identifies the equivalent condition information "(B·C)·A·(F+(D+E))" as equivalent condition information for which the total cost is smallest.

Next, by using the condition division unit 215, the terminal device 20a divides the identified equivalent condition information into partial condition information (S708). Then, by using the condition delegation unit 216, the terminal device 20a sends the partial condition information obtained by the division to another terminal device 20 (S709).

Specifically, when the equivalent condition information "(B·C)·A·(F+(D+E))" is identified, the condition division unit 215 divides this equivalent condition information into first partial condition information "X=Y·A·(F+Z)", second partial condition information "Y=D+E", and third partial condition information "Z=B·C".

Then, the condition delegation unit 216 sends the second partial condition information and the third partial condition information to the terminal device 20b and the terminal device 20c, respectively. Thus, the terminal device 20a may assign, to the terminal device 20b, the processing for determining conditions based on the second partial condition information. The terminal device 20a may assign, to the terminal device 20c, the processing for determining conditions based on the third partial condition information.

As described above, the terminal device 20 of the present embodiment may assign part of the processing for determining conditions based on condition information received from the server device 10, to other terminal devices 20. In addition, the terminal device 20 uses equivalent condition information for which the total cost is smallest among equivalent condition information created based on the condition information and thus may suppress the power consumption of the sensor 109. When information on the accuracy of the sensor 109 is used as a cost, the processing for determining context may be performed by using the sensor 109 with high accuracy. Therefore, in this case, it becomes possible to improve the accuracy of the processing for determining context.

In conjunction with FIG. 7, the case where the terminal device 20a assigns part of the determination processing to the terminal devices 20b and 20c has been described. However, for example, in the terminal device 20 serving as the delegation source, the user may select the terminal device 20 serving as the delegation destination from the list or the like.

Figure 11:
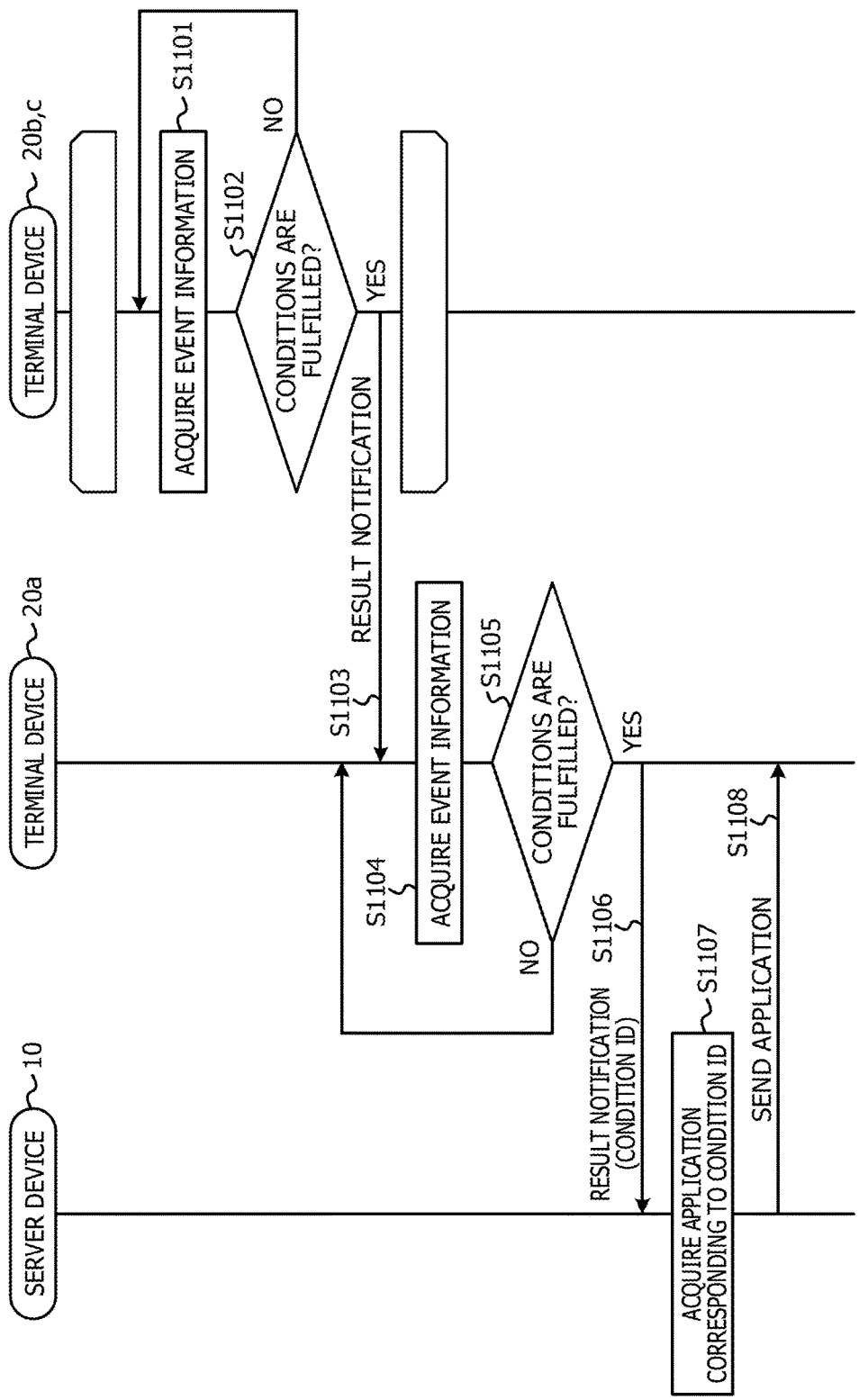
FIG. 11 is a diagram serving to illustrate an example of a flow of a series of processing from acquisition of event information to transmission of an application in the application delivery process according to the first embodiment.

Next, in the application delivery process, processing in which the server device 10 delivers the application 133 in response to a result of the processing for determining conditions in the terminal device 20a will be described with reference to FIG. 11. FIG. 11 is a diagram serving to illustrate an example of the flow of a series of processing from acquisition of event information to sending of an application in the application delivery process according to the first embodiment. Hereinafter, assuming that the terminal device 20a has assigned the processing for determining conditions based on the second partial condition information and the processing for determining conditions based on the third partial condition information to the terminal devices 20b and 20c, respectively, description will be given. Accordingly, the terminal device 20a performs the processing for determining conditions based on the first partial condition information.

Each of the terminal devices 20b and 20c acquires event information by using the event information acquisition unit 221 (S1101). That is, the terminal device 20b acquires event information acquired through sensing of an illumination sensor and event information acquired through sensing of an ultraviolet radiation sensor, by using the event information acquisition unit 221. Similarly, by using the event information acquisition unit 221, the terminal device 20b acquires event information acquired through sensing performed by a humidity sensor and event information acquired through sensing performed by a vibration sensor.

Next, each of the terminal devices 20b and 20c determines, by using the condition determination unit 222, whether or not the conditions based on partial condition information are fulfilled (S1102).

That is, the terminal device 20b determines, by using the condition determination unit 222 based on the acquired event information, whether or not the conditions based on the second partial condition information are fulfilled. For example, if event information acquired from an illumination sensor is information representing "illumination>80 Lx" or if event information acquired from an ultraviolet radiation sensor is information representing "the amount of ultraviolet radiation>100 nm", the condition determination unit 222 of the terminal device 20b determines that the condition is fulfilled.

Similarly, the terminal device 20c determines, by using the condition determination unit 222, based on the acquired event information, whether or not the conditions based on the third partial condition information are fulfilled. For example, if the event information acquired from the humidity sensor is information representing "humidity>80%" and if the event information acquired from the vibration sensor is information representing "vibration>50 dB", the condition determination unit 222 of the terminal device 20c determines that the conditions are fulfilled.

If, in S1102, it is determined that the conditions based on the partial condition information are not fulfilled, the terminal devices 20b and 20c return to S1101.

If, in S1102, it is determined that the conditions based on the partial condition information are fulfilled, each of the terminal devices 20b and 20c notifies the terminal device 20a of a result representing fulfillment of the condition based on the partial condition information, by using the result notification unit 223 (S1103).

That is, the result notification unit 223 of the terminal device 20b gives the terminal device 20a a notification representing that the conditions based on the second partial condition information "Y=D+E" is fulfilled. Similarly, the result notification unit 223 of the terminal device 20c gives the terminal device 20a a notification representing that the conditions based on the third partial condition information "Z=B·C" is fulfilled. In this way, if, in the processing for determining conditions delegated from the terminal device 20 serving as the delegation source, the conditions are fulfilled, the terminal devices 20b and 20c notify the terminal device 20 serving as the delegation source of the fulfillment of the conditions.

Having received result notifications from the terminal devices 20b and 20c, the terminal device 20a acquires event information by using the event information acquisition unit 221 (S1104). That is, by using the event information acquisition unit 221, the terminal device 20a acquires event information acquired through sensing performed by a temperature sensor and event information acquired through sensing performed by a $CO_2$ sensor. On the other hand, the event information acquisition unit 221 of the terminal device 20a does not have to acquire event information for determining conditions sent to the terminal devices 20b and 20c. Consequently, the terminal device 20a does not have to power on, for example, the humidity sensor, the vibration sensor, the illumination sensor, the ultraviolet radiation sensor, and the like.

If, in S1104, the terminal device 20a receives a result notification from either the terminal device 20b or the terminal device 20c, the terminal device 20a does not have to acquire event information. That is, the terminal device 20 serving as the delegation source, when having received result notifications from all the terminal devices 20 serving as the delegation targets, may acquire event information from the sensor 109.

Next, the terminal device 20a determines, by using the condition determination unit 222, whether or not the conditions based on the first partial condition information are fulfilled (S1105).

That is, the terminal device 20a determines, based on, for example, the acquired event information and result notifications received from the terminal devices 20b and 20c, whether or not the condition based on the first partial condition information "X=Y·A·(F+Z)" is fulfilled. Accordingly, in this case, if, for example, the event information acquired from the temperature sensor is information representing "temperature>28° C.", and if the event information acquired from the $CO_2$ sensor is information representing "concentration>1000 ppm" denoted by a symbol "F", the condition determination unit 222 determines that the conditions are fulfilled.

If, in S1105, it is determined that the conditions based on the first partial condition information are not fulfilled, the terminal device 20a returns to S1104.

If, in S1105, it is determined that the conditions based on the first partial condition information are fulfilled, the terminal device 20a notifies the server device 10 of a result representing that the conditions based on the condition information are fulfilled, by using the result notification unit 223 (S1106). Here, the result notification sent from the terminal device 20a to the server device 10 includes the condition ID of the condition information.

Having received the result notification from the terminal device 20a, based on the condition ID included in the result notification, the server device 10 acquires an application name corresponding to the condition ID from the application information table 132. Further, the server device 10 acquires the application 133 corresponding to the acquired application name, from the storage unit 13 (S1107). A plurality of applications 133 may be acquired from the storage unit 13.

Next, by using the application sending unit 12, the server device 10 sends the acquired application 133 to the terminal device 20a (S1108). Thus, the application 133 is delivered to the terminal device 20.

As described above, in the application delivery system 1 of the present embodiment, the application 133 in accordance with the context of the terminal device 20 is delivered from the server device 10 to the terminal device 20. Thus, in the application delivery system 1 of the present embodiment, the application 133 suitable in accordance with the circumstances (context) in which the terminal device 20 is used may be delivered.

In the application delivery system 1 of the present embodiment, in the determination processing in which the terminal device 20 determines context, part of the determination processing may be assigned to other terminal devices 20. Thus, the terminal device 20 may reduce the load of processing for determining context in such a manner that the load of processing for determining context is distributed to other terminal devices 20.

Second Embodiment

Next, the application delivery system 1 according to a second embodiment will be described. In the description of the second embodiment, differences from the first embodiment will be described. Further, components having functional configurations as in the first embodiment are denoted by the reference characters similar to the reference characters used in the description of the first embodiment, and the description thereof is omitted.

In the application delivery system 1 according to the present embodiment, the determination processing in the terminal device 20 serving as the delegation target is performed based on event information acquired in the terminal device 20 serving as the delegation source. In the application delivery system 1 according to the present embodiment, the total cost is calculated also based on the performance information of logical operations of the terminal device 20.

Figure 12:
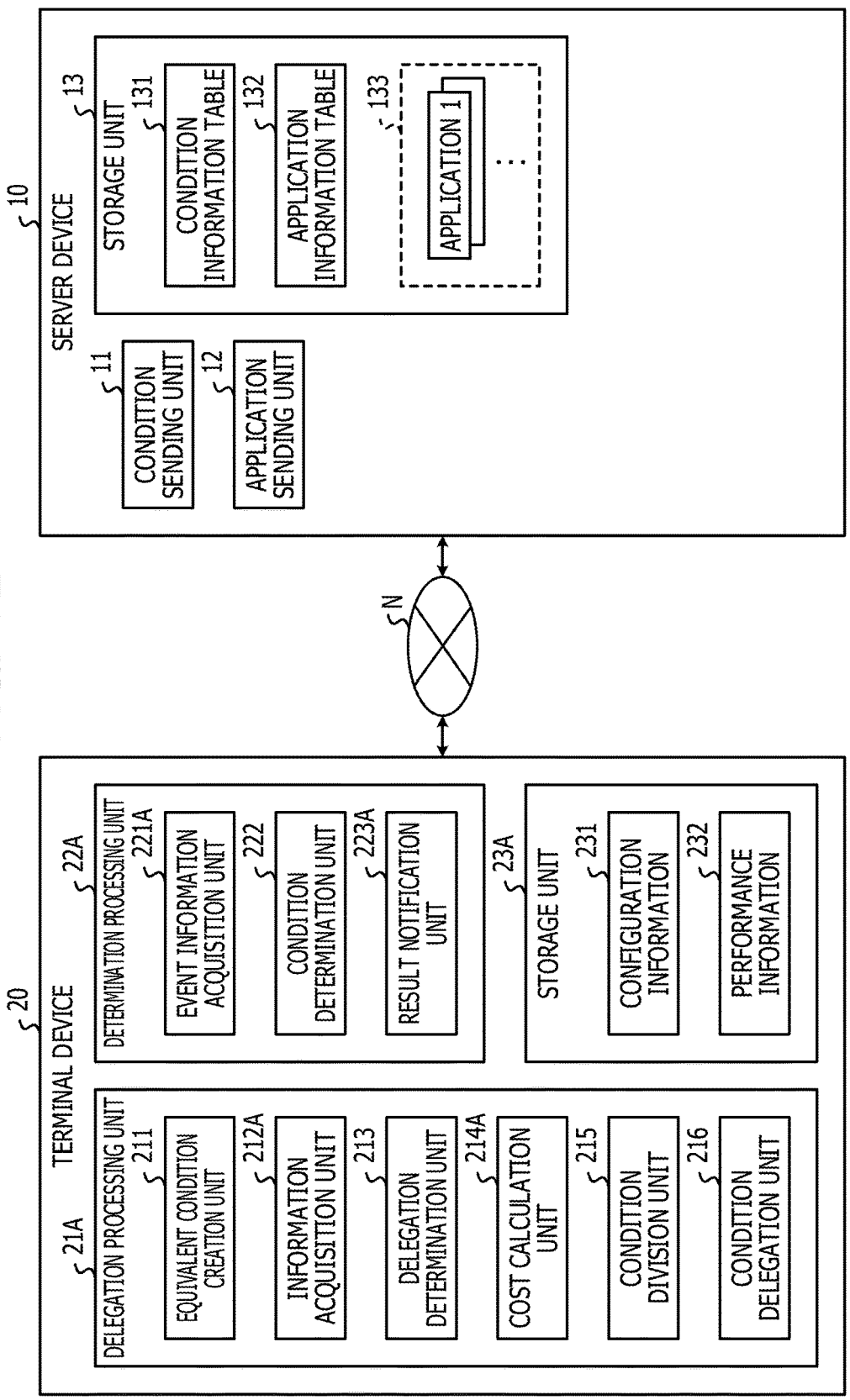
FIG. 12 is a diagram illustrating an example of a functional configuration of an application delivery system according to a second embodiment.

First, the functional configuration of the application delivery system 1 according to the present embodiment will be described with reference to FIG. 12. FIG. 12 is a diagram illustrating an example of functional configurations of an application delivery system according to the second embodiment. A delegation processing unit 21A of the present embodiment includes an information acquisition unit 212A and a cost calculation unit 214A. A determination processing unit 22A of the present embodiment includes an event information acquisition unit 221A and a result notification unit 223A. Further, a storage unit 23A of the present embodiment includes performance information 232.

The information acquisition unit 212A acquires configuration information 231 and performance information 232 of another terminal device 20. Here, the performance information 232 is information related to the performance of logical operations performed by the condition determination unit 222.

Based on the configuration information 231 and the performance information 232 acquired by the information acquisition unit 212A, the cost calculation unit 214A calculates the total cost of equivalent condition information.

An event information acquisition unit 221A acquires event information from the sensor 109. The event information acquisition unit 221A sends event information for use in the determination processing of the terminal device 20 serving as the delegation target, among the acquired event information, to the terminal device 20 serving as the delegation target.

The result notification unit 223A in the terminal device 20 serving as the delegation target sends a result of a determination of the conditions based on the partial condition information made by the condition determination unit 222 to the terminal device 20 serving as the delegation source.

The performance information 232 is information related to the performance of logical operations performed by the condition determination unit 222 of the terminal device 20. Hereinafter, the performance information 232 of the terminal device 20a is referred to as performance information 232a, the performance information 232 of the terminal device 20b as performance information 232b, and the performance information 232 of the terminal device 20c as performance information 232c, so that they are distinguished from one another.

Here, the performance information 232 will be described in detail with reference to FIG. 13. FIG. 13 includes diagrams depicting an example of a configuration of performance information according to the second embodiment.

In performance information 232a to 232c depicted in FIG. 13, the operation types of logical operations performed by the condition determination unit 222 are stored in association with cost representing processing time. That is, in the performance information 232a, the operation time of an AND operation and the operation time of an OR operation in the condition determination unit 222 of the terminal device 20a are stored as costs. The performance information 232b and the performance information 232c are stored similarly.

Figure 14:
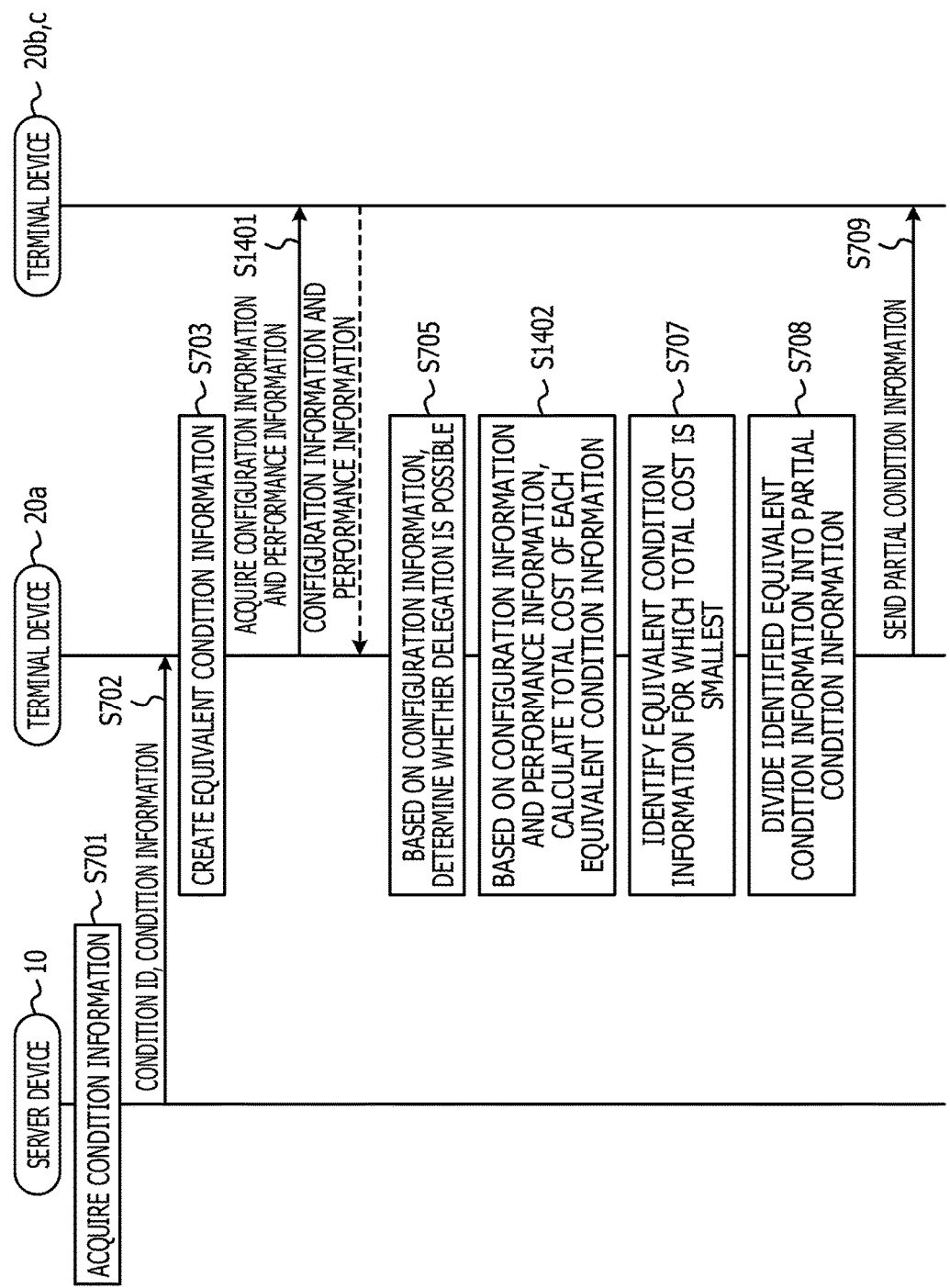
FIG. 14 is a diagram serving to illustrate an example of a flow of a series of processes from acquisition of condition information to transmission of partial condition information in the application delivery system according to the second embodiment.

Next, an application delivery process according to the second embodiment will be described. First, in the application delivery process, the processing from acquisition of acquires condition information from the server device 10 performed by the terminal device 20 to assignment of part of the processing for determining the conditions based on the condition information to other terminal devices 20 will be described with reference to FIG. 14. FIG. 14 is diagram serving to illustrate an example of a flow of a series of processing from acquisition of condition information to sending of partial condition information in the application delivery process according to the second embodiment. In FIG. 14, the process in S701 to S703, S705, and S707 to S709 is similar to that in the first embodiment, and the description thereof is omitted.

By using the information acquisition unit 212, the terminal device 20a acquires the configuration information 231 and the performance information 232 from the terminal device 20b and the terminal device 20c, respectively (S1401).

In S1401, the terminal device 20a acquires the performance information 232b and the performance information 232c from the terminal devices 20b and 20c, respectively. However, the performance information 232b and the performance information 232c are not limited to this and may be stored in advance in the storage unit 23 of the terminal device 20a. The terminal device 20a may acquire the performance information 232b and 232c from the server device 10.

By using the cost calculation unit 214A, the terminal device 20a calculates the total cost of equivalent condition information based on the configuration information 231a to 231c and the performance information 232a to 232c (S1402).

Here, a specific example of calculating the total cost of equivalent condition information will be described with reference to FIG. 15. FIG. 15 is a diagram serving to illustrate a specific example of calculation of the total cost according to the second embodiment. The total cost of the present embodiment is the cost obtained by adding the cost based on the performance information 232a to 232c to the cost calculated from the configuration information 231a in a way similar to that in the first embodiment when the sensor 109 of the terminal device 20a is used.

In the example of FIG. 15, equivalent condition information "(A·B)·C·(D+(E+F))" includes two ANDs and three ORs. Accordingly, the total cost of the present embodiment has a value "7.1", which is obtained by adding the AND operation cost 2×0.3 and the OR operation cost 3×0.4 in the terminal device 20a to the cost 5.3 calculated from the configuration information 231a.

Equivalent condition information "(A·B)·C·(F+(D+E))" will be described. For the equivalent condition information "(A·B)·C·(F+(D+E))", it is possible to assign the processing for determining the condition of "(D+E)" shaded in FIG. 15 to the terminal device 20b. Accordingly, the total cost of the present embodiment has a value "6.9", which is obtained by adding the AND cost 1×0.3 and the OR operation cost 3×0.4 in the terminal device 20a, and the AND operation cost 1×0.1 in the terminal device 20b to the cost 5.3 calculated from the configuration information 231a.

Similarly, equivalent condition information "(B·C)·A·(F+(D+E))" will be described. For the equivalent condition information "(B·C)·A·(F+(D+E))", it is possible to assign the processing for determining the condition of "(B·C)" shaded in FIG. 15 to the terminal device 20c. Similarly, it is possible to assign the processing for determining the condition of "(D+C)" to the terminal device 20b. Accordingly, the total cost of the present embodiment has a value of "6.8", which is obtained by adding the AND operation cost 1×0.3 and the OR operation cost 2×0.4 in the terminal device 20a, the AND operation cost 1×0.1 in the terminal device 20b, and the OR operation cost 1×0.3 in the terminal device 20c to the cost 5.3 calculated from the configuration information 231a. For other equivalent condition information, the total cost of the present embodiment is calculated similarly.

To the total cost calculated in conjunction with FIG. 15, for example, the cost related to network communication between the terminal device 20a and the terminal device 20b as well as the terminal device 20c may be added. Thus, it is possible to calculate the total cost that takes into account communication speed between the terminal device 20a and the terminal device 20b as well as the terminal device 20c, or the like.

As described above, the terminal device 20 of the present embodiment may assign, to other terminal devices 20, part of the processing for determining the conditions based on condition information received from the server device 10. In addition, in the present embodiment, equivalent condition information for which the total cost is smallest based on the performance information 232 of the terminal device 20 is used, and thus the period of time taken for arithmetic processing may be suppressed.

Figure 16:
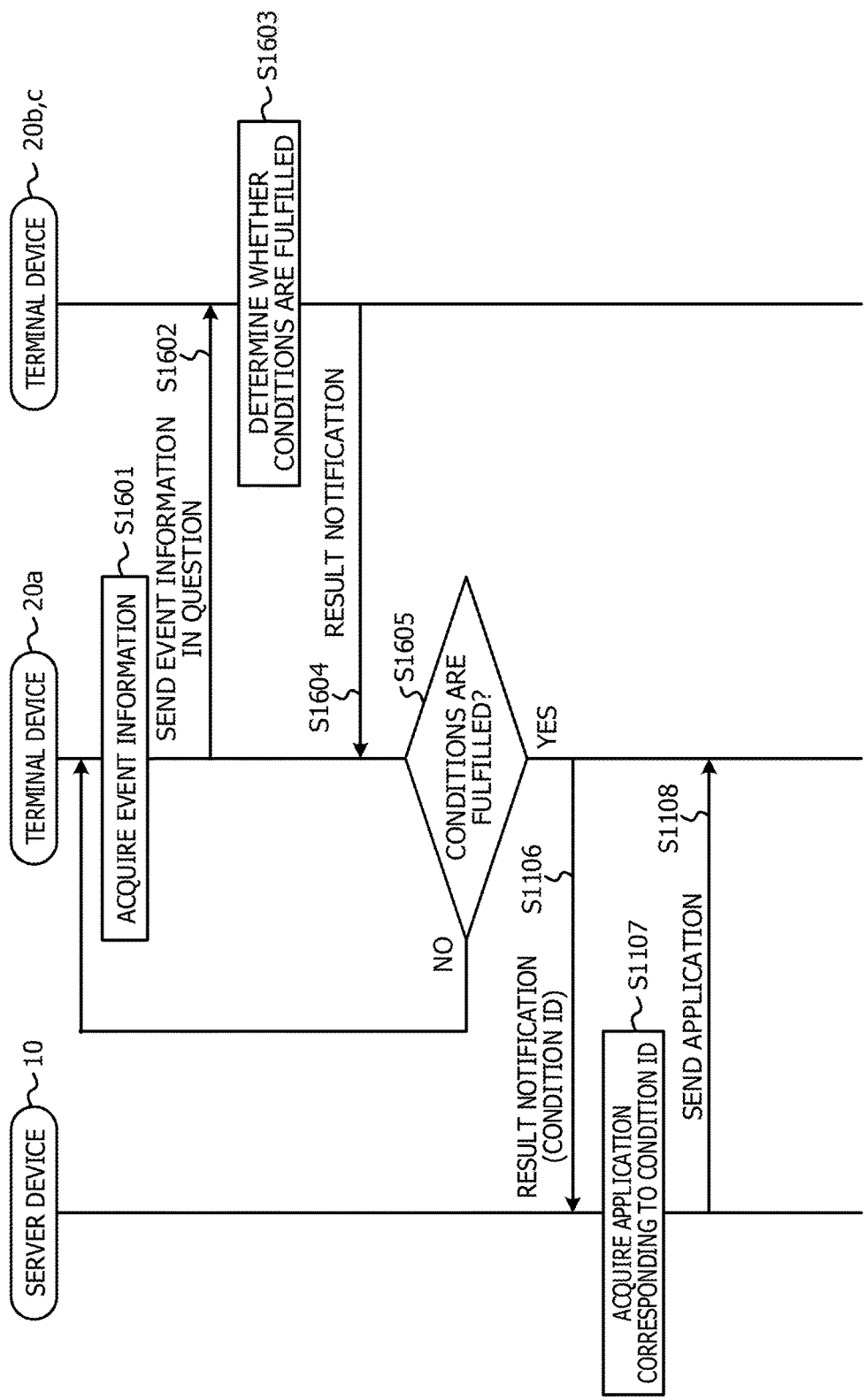
FIG. 16 is a diagram serving to illustrate an example of a flow of a series of processes from acquisition of event information to transmission of an application in the application delivery process according to the second embodiment.

In the application delivery process, processing in which the server device 10 delivers the application 133 in accordance with a result of the processing for determining the conditions in the terminal device 20a will be described with reference to FIG. 16. FIG. 16 is a diagram serving to illustrate an example of a flow of a series of processing from acquisition of event information to sending of an application in the application delivery process according to the second embodiment. In FIG. 16, the process from S1106 to S1108 is similar to that in the first embodiment, and therefore the description thereof is omitted.

The terminal device 20a acquires event information by using an event information acquisition unit 221A (S1601). That is, the event information acquisition unit 221A acquires event information acquired through sensing performed by the sensor 109 mounted in the terminal device 20a.

Next, by using the event information acquisition unit 221A, the terminal device 20a sends event information for use in the processing for determining the conditions based on the partial condition information in each of the terminal devices 20b and 20c (S1602). For example, when the processing for determining the condition based on the second partial condition information "Y=D+E" is assigned to the terminal device 20b, the terminal device 20a sends event information acquired from an illumination sensor and event information acquired from an ultraviolet radiation sensor to the terminal device 20b. Similarly, when the processing for determining the conditions based on the third partial condition information "Z=B·C" is assigned to the terminal device 20c, the terminal device 20a sends event information acquired from the humidity sensor and event information acquired from the vibration sensor to the terminal device 20c.

Next, each of the terminal devices 20b and 20c determines, by using the condition determination unit 222, based on event information received from the terminal device 20a, whether or not the conditions based on partial condition information are fulfilled (S1603). Further, by using a result notification unit 223A, each of the terminal devices 20b and 20c notifies the terminal device 20a of a determination result (S1604). Here, in the present embodiment, each of the terminal devices 20b and 20c sends either a result notification indicating that the conditions are fulfilled or a result notification indicating that the conditions are not fulfilled to the terminal device 20a.

Subsequently, the terminal device 20a, upon receipt of result notifications from the terminal devices 20b and 20c, determines by using the condition determination unit 222, based on the acquired event information and the received result notifications, whether or not the conditions based on the first partial condition information are fulfilled (S1605).

In S1605, if it is determined that the conditions are not fulfilled, the terminal device 20a returns to S1601.

In S1605, if it is determined the conditions are fulfilled, the terminal device 20a performs the process in S1106.

As described above, in the application delivery system 1 of the present embodiment, when part of the process for determining the circumstances (context) in which the terminal device 20 is used is assigned to other terminal devices 20, a determination may be made using event information of the sensor 109 of the terminal device 20 serving as the delegation source. Thus, the terminal device 20 serving as the delegation target does not necessarily have to include the sensor 109.

That is, in the terminal device 20 serving as the delegation target, the sensor type only has to be set in the configuration information 231, and the sensor 109 corresponding to the sensor type set in the configuration information 231 does not necessarily have to be included. In this way, the terminal device 20 of the present embodiment may assign part of the processing for determining context to another terminal device 20 without the sensor 109. Accordingly, the terminal device 20 may reduce the load of processing for determining context in such a manner that the load of processing for determining context is distributed to other terminal devices 20.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A load balancing method executed by an information processing apparatus, the load balancing method comprising:
    identifying, in first determination processing for determining circumstances based on an event acquired by a sensor included in the information processing apparatus, a type of an event that another information processing apparatus coupled to the information processing apparatus is able to acquire by using a sensor included in the another information processing apparatus;
    determining, based on the identified type, whether a logic tree representing the first determination processing is able to be changed to another logic tree that includes a partial logic tree determined based on an event of the identified type and is equivalent in condition to the logic tree; and
    assigning second determination processing represented by the partial logic tree included in the another logic tree to the another information processing apparatus, when determining that the logic tree is able to be changed to the another logic tree,
    wherein the assigning includes:
        calculating a cost of the another logic tree based on information related to the sensor of the information processing apparatus and information related to the sensor of the another information processing apparatus, and
        assigning the second determination processing represented by the partial logic tree included in the another logic tree for which the calculated cost is smallest, to the another information processing apparatus.

2. The load balancing method according to claim 1, further comprising
    receiving, from a server device coupled to the information processing apparatus, condition information including a logic tree representing the first determination processing.

3. The load balancing method according to claim 2, further comprising:
    receiving a notification of fulfillment of a condition related to the second determination processing from the another information processing apparatus;
    transmitting, to the server device, a notification of fulfillment of a condition related to a determination process for the another logic tree, the notification including content of the received notification of fulfillment of the condition related to the second determination processing; and
    receiving, from the server device, an application in accordance with the notification of fulfillment of the condition related to the determination process for the another logic tree, the application corresponding to the condition information.

4. The load balancing method according to claim 3, wherein the notification of fulfillment of the condition related to the determination process for the another logic tree includes an identifier representing the condition information, and
    the load balancing method further comprising:
        storing, by the server, application information in which a plurality of applications are stored in association with identifiers, respectively,
        extracting an application corresponding to the received identifier from the application information, when receiving the notification of fulfillment of the condition related to the determination process for the another logic tree, and
        delivering the extracted application to the information processing apparatus.

5. The load balancing method according to claim 1, wherein the cost is a value representing a total of power consumption per unit time of the sensor of the information processing apparatus and the sensor of the another information processing apparatus when a determination process represented by the another logic tree is executed.

6. The load balancing method according to claim 1, wherein the type of an event acquired by the sensor of the information processing apparatus includes two or more parameters among a plurality of parameters including temperature, humidity, illumination, or an amount of ultraviolet radiation.

7. The load balancing method according to claim 6, wherein the logic tree representing the first determination processing is generated by setting a plurality of determination conditions for determining the two or more parameters by comparing the two or more parameters with different given values, respectively, and combining the determination conditions by OR operation or AND operation.

8. An information processing apparatus, comprising:
    a memory; and
    a processor coupled to the memory and configured to:
        identify, in first determination processing for determining circumstances based on an event acquired by a sensor of the information processing apparatus, a type of an event that another information processing apparatus coupled to the information processing apparatus is able to acquire by using a sensor included in the another information processing apparatus, determine, based on the identified type, whether a logic tree representing the first determination processing is able to be changed to another logic tree including a partial logic tree determined based on an event of the identified type and is equivalent in condition to the logic tree, and assign second determination processing represented by the partial logic tree included in the another logic tree to the another information processing apparatus, when determining that the logic tree is able to be changed to the another logic tree, wherein the processor is configured to assign the second determination processing by:

calculating a cost of the another logic tree based on information related to the sensor of the information processing apparatus and information related to the sensor of the another information processing apparatus, and assigning the second determination processing represented by the partial logic tree included in the another logic tree for which the calculated cost is smallest, to the another information processing apparatus.

9. A non-transitory computer-readable storage medium storing a program that causes a computer to executed a process, the process comprising:

identifying, in first determination processing for determining circumstances based on an event acquired by a sensor included in the information processing apparatus, a type of an event that another information processing apparatus coupled to the information processing apparatus is able to acquire by using a sensor included in the another information processing apparatus;

determining, based on the identified type, whether a logic tree representing the first determination processing is able to be changed to another logic tree that includes a partial logic tree determined based on an event of the identified type and is equivalent in condition to the logic tree; and assigning second determination processing represented by the partial logic tree included in the another logic tree to the another information processing apparatus, when determining that the logic tree is able to be changed to the another logic tree, wherein the assigning includes:

calculating a cost of the another logic tree based on information related to the sensor of the information processing apparatus and information related to the sensor of the another information processing apparatus, and assigning the second determination processing represented by the partial logic tree included in the another logic tree for which the calculated cost is smallest, to the another information processing apparatus.

* * * * *